United States Patent
Kobayashi (10) Patent No.: US 11,787,121 B2
(45) Date of Patent: Oct. 17, 2023

(54) ADDITIVE MANUFACTURING METHOD

(71) Applicant: TOKYO METROPOLITAN INDUSTRIAL TECHNOLOGY RESEARCH INSTITUTE, Tokyo (JP)

(72) Inventor: Ryuichi Kobayashi, Tokyo (JP)

(73) Assignee: TOKYO METROPOLITAN INDUSTRIAL TECHNOLOGY RESEARCH INSTITUTE, Tokyo (JP)

(*) Notice: Subject to any disclaimer, the term of this patent is extended or adjusted under 35 U.S.C. 154(b) by 207 days.

(21) Appl. No.: 17/142,805

(22) Filed: Jan. 6, 2021

(65) Prior Publication Data

US 2021/0146633 A1 May 20, 2021

Related U.S. Application Data

(63) Continuation of application No. 15/980,826, filed on May 16, 2018, now abandoned.

(30) Foreign Application Priority Data

Jun. 16, 2017 (JP) ................................. 2017-118594

(51) Int. Cl.
  *B29C 64/393* (2017.01)
  *B33Y 30/00* (2015.01)
  (Continued)

(52) U.S. Cl.
  CPC .......... *B29C 64/393* (2017.08); *B29C 64/153* (2017.08); *B29C 64/20* (2017.08);
  (Continued)

(58) Field of Classification Search
  CPC ..... B29C 64/393; B29C 64/153; B29C 64/20; B29C 64/255; B29C 64/364; B33Y 10/00; B33Y 30/00; B33Y 40/00
  See application file for complete search history.

(56) References Cited

U.S. PATENT DOCUMENTS

| 7,521,652 B2 | 4/2009 | Chung et al. |
| 2006/0118532 A1 | 6/2006 | Chung et al. |

(Continued)

FOREIGN PATENT DOCUMENTS

| JP | 2004-076040 A | 3/2004 |
| JP | 2006-150977 A | 6/2006 |
| JP | 2006-183146 A | 7/2006 |

OTHER PUBLICATIONS

Office Action issued in Japanese Patent Application No. 2017-118594 dated May 17, 2021 with English Translation (10 pages).
(Continued)

*Primary Examiner* — S. Behrooz Ghorishi
(74) *Attorney, Agent, or Firm* — Nakanishi IP Associates, LLC (57) ABSTRACT

An additive manufacturing method is provided for building a manufacturing object by building of repeating formation of one of a sintered portion or a fused portion by selectively heating a thinly developed powder material within a working region on the basis of drawing data derived from three-dimensional data of the manufacturing object and further formation of a new thin layer on one of the sintered portion or the fused portion. The additive manufacturing apparatus includes one or more channels connecting the inside and the outside of the region, and introduces a fluid into a crack progressing into the un-fused powder material through the channel after completion of building to forcibly cool one of the sintered portion or the fused portion, and the un-fused powder material.

13 Claims, 6 Drawing Sheets

(51) Int. Cl.
    *B29C 64/20*     (2017.01)
    *B29C 64/153*    (2017.01)
    *B29C 64/255*    (2017.01)
    *B29C 64/364*    (2017.01)
    *B33Y 10/00*     (2015.01)
    *B33Y 40/20*     (2020.01)

(52) U.S. Cl.
    CPC .......... *B29C 64/255* (2017.08); *B29C 64/364* (2017.08); *B33Y 10/00* (2014.12); *B33Y 30/00* (2014.12); *B33Y 40/20* (2020.01)

(56) References Cited

U.S. PATENT DOCUMENTS

2007/0001342 A1* 1/2007 Oberhofer ............... B07B 13/16
                                                      264/237
2017/0129052 A1* 5/2017 Buller ................ B23K 15/0086

OTHER PUBLICATIONS

NPL2 Decision to Grant Patent issued in Japanese Patent Application No. 2017-118594 dated Aug. 2, 2021 with English Translation (5 pages).

* cited by examiner

Crack to be used as channel

CHANNEL 14   WORKTABLE 18

Fig. 9

ADDITIVE MANUFACTURING METHOD

CROSS-REFERENCE TO RELATED APPLICATIONS

This application is a continuation application of the patent application Ser. No. 15/980,826 filed on May 16, 2018, which claims the benefit of priority from Japanese Patent Application No. 2017-118594 filed on Jun. 16, 2017, the entire contents of which are incorporated by reference.

BACKGROUND

Technical Field

The present invention relates to an additive manufacturing apparatus and an additive manufacturing system, and particularly relates to an additive manufacturing apparatus and an additive manufacturing system capable of reducing the time to complete a manufacturing object, particularly the cooling time, in additive manufacturing by powder bed fusion using a resin.

Related Art

Conventionally, an additive manufacturing apparatus using powder bed fusion first forms a thin layer of powder, and then, draws a cross-sectional shape of a manufacturing object using a means capable of selectively applying a heat quantity such as a laser for fusion. A three-dimensional manufacturing object can be obtained by repeating this thin layer formation and laser drawing.

Typical powder bed fusion uses a crystalline resin, and the temperature of the powder is maintained between the melting point and the recrystallization temperature in many cases of thin layer formation and laser drawing. After completion of building, the manufacturing object is buried in un-fused powder (referred to as a cake), and the internal temperature of the cake containing the manufacturing object immediately after completion of building is high (about 170 degrees in the case of nylon 12, for example).

In a current method, the cake is naturally air-cooled, and thus, there is a waiting time till the resin solidifies and cools to a temperature (for example, 50° C. or below), that is, an endurable temperature for extracting the manufacturing object, leading to a problem of long cooling time needed to obtain the manufacturing object. In addition, because enlargement of equipment and the use of super-engineering plastic materials are desired in recent years, the time needed for cooling might be remarkably prolonged, in this case.

In view of this, JP 2006-183146 A discloses a control cooling method and apparatus for performing laser sintering on a component-containing cake, including a process of selectively forming one or more heat transfer paths inside the cake so as to promote cooling of the internal temperature of the cake containing a manufacturing object.

Moreover, JP 4919326 B2 discloses a temperature management system for a removable building chamber to be used with a laser sintering system that monitors the temperature of a cake containing a manufacturing object at a selected position around the cake containing the manufacturing object so as to control the cooling of the cake containing the manufacturing object in a process of controlling the cooling of the building chamber to decrease the temperature of the building chamber and the cake containing the manufacturing object to a temperature at which at least one component inside the cake can be extracted by breaking the cake containing the manufacturing object.

SUMMARY

Unfortunately however, the technique disclosed in JP 2006-183146 A is considered to have a problem that a manufacturing object cannot be arranged in a portion where a heat transfer duct is to be formed, leading to a reduction in a manufacturing region and a dimensional restriction of the manufacturing object.

Furthermore, the technique disclosed in JP 4919326 B2 uses the cooling of the building chamber to cool the cake, and thus, the heat transfer is mainly performed between the building chamber and the cake. When the cooling progresses, however, the cake shrinks due to the temperature decrease, and this causes a problem of generation of a gap between the building chamber and the cake, leading to decreased cooling efficiency.

The present invention is intended to deal with the above-described problem and aims to provide a additive manufacturing apparatus and a additive manufacturing system capable of reducing the time, particularly the cooling time, needed to complete a manufacturing object by promoting cooling of the internal temperature of a cake containing a manufacturing object without requiring a special structure that might restrict the arrangement of the manufacturing object and induce reduction of cooling efficiency, in the additive manufacturing by powder bed fusion using a resin.

In order to solve the above problem, the present invention takes the following technical means.

That is, a first aspect of the invention is an additive manufacturing apparatus configured to build a manufacturing object by building of repeating formation of one of a sintered portion or a fused portion by selectively heating a thinly developed powder material within a working region on the basis of drawing data derived from three-dimensional data of the manufacturing object and further formation of a new thin layer on one of the sintered portion or the fused portion, the additive manufacturing apparatus comprising one or more channels connecting the inside and the outside of the working region, and configured to introduce a fluid into a crack progressing into the un-fused powder material through the channel after completion of building to forcibly cool one of the sintered portion or the fused portion, and the un-fused powder material.

A second aspect of the invention is the additive manufacturing apparatus according to the first aspect, further including a temperature measurement unit to measure an internal temperature of the un-fused powder material after completion of building, in which a fluid is introduced through the channel in a case where the temperature measurement unit measured the internal temperature below a prescribed temperature. A third aspect of the invention is the additive manufacturing apparatus according to the first aspect, further including a database having recorded a lamination height and an elapsed time from the completion of building during which the crack of the powder material progresses at the lamination height, in which the elapsed time from the completion of building during which the crack of the powder material progresses is estimated on the basis of the database from the lamination height by the building, and the fluid is introduced through the channel when the elapsed time arrives.

A fourth aspect of the invention is the additive manufacturing apparatus according to the first aspect, in which the channel includes one or more pressure measurement units to measure a pressure of the fluid and one or more flow rate controllers to control a flow rate of the fluid, and the pressure measurement unit and the flow rate controller control to suppress introduction of a fluid of a prescribed pressure or more into the crack progressing in the powder material through the channel.

A fifth aspect of the invention is the additive manufacturing apparatus according to the first aspect, further including: a temperature measurement unit to measure an internal temperature of the un-fused powder material after completion of building; and a flow rate controller in the channel to control the flow rate of the fluid, in which the flow rate controller increases the flow rate of the fluid to be introduced through the channel in accordance with a decrease in the internal temperature in a case where the temperature measurement unit measured the decrease in the internal temperature.

A sixth aspect of the invention is the additive manufacturing apparatus according to the first aspect, in which a temperature controller for controlling the temperature of the fluid introduced through the channel to a crack progressing in the powder material is provided in the channel. A seventh aspect of the invention is the additive manufacturing apparatus according to the first aspect, in which a worktable capable of moving up and down is provided in the working region, the manufacturing object is built on the worktable by the building and the channel includes a channel upper end and a channel lower end with the channel upper end being attached to the worktable, and one end of the channel upper end is configured to be able to be connected to one end of the channel lower end via a connecting portion installed between the channel upper end and the channel lower end in accordance with an up/down position of the worktable.

The eighth aspect of the invention is the additive manufacturing apparatus according to the first aspect, in which a fluid discharge path through which the fluid introduced from the channel into the working region can be discharged to the outside of the working region is formed. A ninth aspect of the invention is the additive manufacturing apparatus according to the eighth aspect, in which a filter to separate the powder from the fluid is provided in the middle of the fluid discharge path.

A tenth aspect of the invention is a additive manufacturing system including a additive manufacturing apparatus configured to build a manufacturing object by building of repeating formation of one of a sintered portion or a fused portion by selectively heating a thinly developed powder material within a working region on the basis of drawing data derived from three-dimensional data of the manufacturing object and further formation of a new thin layer on one of the sintered portion or the fused portion, in which the working region includes a worktable capable of moving up and down, the manufacturing object being built on the worktable by the building, the working region includes one or more channels connecting the inside and outside of the working region, the system includes a storage capable of storing the working region and includes one or more intra-storage channels connecting the inside and outside of the storage, the system stores the working region, the worktable, and the channel in the storage after completion of building, the system controls to connect the channel with the intra-storage channel via an intra-storage connecting portion, and the system introduces a fluid into a crack progressing into the un-fused powder material from the outside of the storage through the channel to forcibly cool one of the sintered portion or the fused portion, and the un-fused powder material.

An eleventh aspect of the invention is the additive manufacturing system according to the tenth aspect, in which the storage is available as a working region for extracting the manufacturing object. A twelfth aspect of the invention is the additive manufacturing system according to the tenth aspect, in which a fluid discharge path through which the fluid introduced through the channel into the working region can be discharged to the outside of the working region is formed. A thirteenth aspect of the invention is the additive manufacturing system according to the eleventh, in which a fluid discharge path through which the fluid introduced through the channel into the working region can be discharged to the outside of the working region is formed.

A fourteenth aspect of the invention is the additive manufacturing system according to the twelfth aspect, in which a filter to separate the powder from the fluid is provided in the middle of the fluid discharge path. A fifteenth aspect of the invention is the additive manufacturing system according to the thirteenth aspect, in which a filter to separate the powder from the fluid is provided in the middle of the fluid discharge path.

According to the additive manufacturing apparatus and the additive manufacturing system according to the present invention, it is possible to reduce the cooling time needed after additive manufacturing of the manufacturing object without providing a special structure that might cause the restriction of the arrangement of the manufacturing object and the reduction of the cooling efficiency.

DETAILED DESCRIPTION

Subsequently, an additive manufacturing apparatus according to a first embodiment of the present invention will be described with reference to the drawings.

Figure 1:
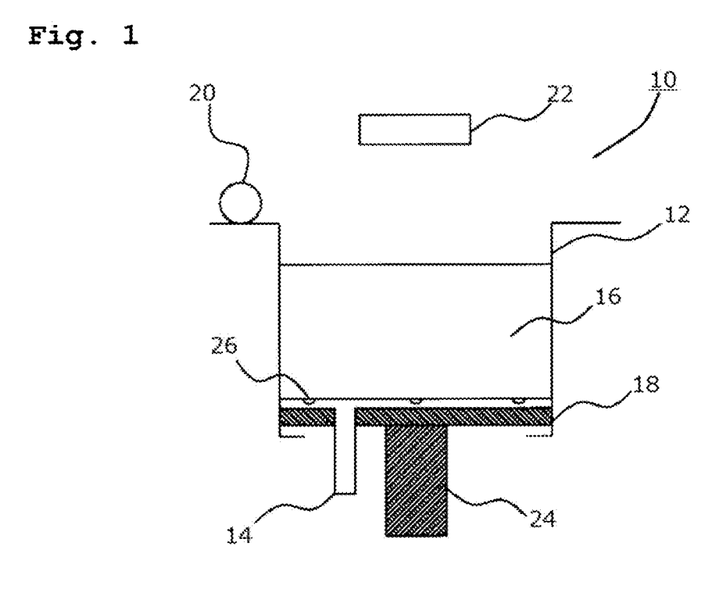
FIG. 1 is a schematic diagram illustrating a configuration of an additive manufacturing apparatus according to a first embodiment of the present invention.

FIG. 1 is a schematic diagram illustrating a configuration of the additive manufacturing apparatus according to the first embodiment of the present invention. Reference numeral 10 denotes an additive manufacturing apparatus, reference numeral 12 denotes a working region, reference numeral 14 denotes a channel, reference numeral 16 denotes a cake containing a manufacturing object, reference numeral 18 denotes a worktable, reference numeral 20 denotes a layer forming mechanism, reference numeral 22 denotes a drawing mechanism, reference numeral 24 denotes an elevator, and reference numeral 26 denotes a hole.

First, as illustrated in FIG. 1, the additive manufacturing apparatus 10 according to the present embodiment forms a manufacturing object by building of repeating a procedure of forming a sintered portion or a fused portion by selectively heating a thinly developed powder material in the working region 12 on the basis of drawing data derived from three-dimensional data of the manufacturing object and a procedure of further forming a new thin layer on the sintered portion or the fused portion.

Furthermore, the present invention is characterized by including one or more channels 14 connecting the inside and outside of the working region 12, and introducing a fluid to a crack progressing to an un-fused power material (cake 16 containing a manufacturing object) through the channel 14 after the building is finished, so as to forcibly cool the sintered portion or the fused portion, and the un-fused powder material.

Subsequently, the additive manufacturing apparatus 10 in the present embodiment will be described in detail. As illustrated in FIG. 1, the additive manufacturing apparatus 10 includes the worktable 18 in the working region 12, and this worktable 18 has a channel 14. While the channel 14 is arranged on the worktable 18 alone in this drawing, the position is not limited to this and the channel 14 may be provided also in the working region 12. While this drawing illustrates the worktable 18 and the channel 14 being arranged separately, the channel 14 and the worktable 18 may be integrated with each other.

Subsequently, building is performed by the layer forming mechanism 20 on the worktable 18 with the channel 14, or in the working region 12, so as to form the cake 16 containing the manufacturing object in a state of being in contact with the channel 14. During the building, a laminated powder surface, the worktable 18, and the working region 12 are heated by a heating means (not illustrated) such as a heater.

For example, when nylon 12 is used, the powder surface temperature is heated to about 170° C. Furthermore, the powder surface is partially sintered or fused by the drawing mechanism 22 using a laser or the like. After the building is finished, the heating by the heating means is stopped, and the cake 16 containing the manufacturing object is left until being cooled to about room temperature.

The internal temperature of the cake 16 containing the manufacturing object after completion of building is substantially equal to the temperature at lamination, being about 170° C. As the cooling advances, a crack is formed in the cake 16 containing the manufacturing object, and the crack is estimated to make substantial progress when reaching a recrystallization temperature (about 135° C. in the case of nylon (PA) 12, about 220° C. in the case of polyphenylene sulfide (PPS)).

There are two main probable factors causing the crack in the cake 16 containing a manufacturing object. One is a case where distortion occurring when the whole cake 16 containing a manufacturing object shrinks due to the cooling causes difficulty in maintaining continuity in the cake 16 containing the manufacturing object, leading to generation of the crack. The other is a case where the crack occurs due to a difference between the shrinkage amounts of the cake 16 containing the manufacturing object and the fused portion. In consideration of the increase in the surface area of the interior of the cake 16 containing the manufacturing object by the occurrence of the crack, the present invention is intended to positively release the heat from this surface to promote cooling.

When a fluid is introduced from the hole 26 into the working region 12 at a stage when the crack has progressed, the fluid passes through the crack of the cake 16 containing the manufacturing object and through a portion between the working region 12 and the cake 16 containing the manufacturing object, so as to flow toward the outside of the region 12. At this time, the fluid flowing through the crack has an effect of internally cooling the cake 16 containing the manufacturing object. Incidentally, forming a fluid discharge path to discharge the fluid containing a powder to the outside of the working region 12 would be preferable in terms of environmental protection. Moreover, providing a filter that separates the powder from the fluid in the middle of the fluid discharge path would facilitate powder recovery.

In addition, there is a need to provide at least one hole 26, and considering that the crack can be generated at an arbitrary position of the cake 16 containing the manufacturing object, it is desirable in practice that the holes 26 be arranged evenly on a surface on which the cake 16 and the channel 14 come in contact with each other.

Furthermore, the hole 26 need to be formed as a hole small enough to suppress reverse flow of the powder, or need to use a mesh (not illustrated) or the like having a meshed pattern smaller than the particle size for the holes larger than the particle size of the powder so as to prevent reverse flow of the powder.

Furthermore, while an optimum value of the flow rate varies depending on the powder material and the fluid used, and the size of the working region 12, an excessively low flow rate would lower the cooling efficiency, and an excessively high flow rate would apply a heavy load on the sintered portion or the fused portion, causing deformation, and thus, there is a need to be careful about this point.

An experiment using air as a fluid was performed, in which when the fluid at a flow rate of approximately 50 L/min was introduced into the working region 12 from the hole 26, no significant deformation was observed in the completed manufacturing object. This experiment achieved a cooling time of about 16 hours, and it was found that the cooling time can be greatly reduced compared with the time of about 32 hours achieved under the condition when the fluid is not applied to the crack.

While the present embodiment is an example in which fluid is introduced into the crack from the hole 26, this would not obstruct a method of sucking the fluid from the hole 26. Suction, however, is not recommended because of its possibility of generation of clogging of the hole 26 by un-fused powder.

Subsequently, an additive manufacturing apparatus according to a second embodiment the present invention will be described with reference to the drawings.

Figure 2:
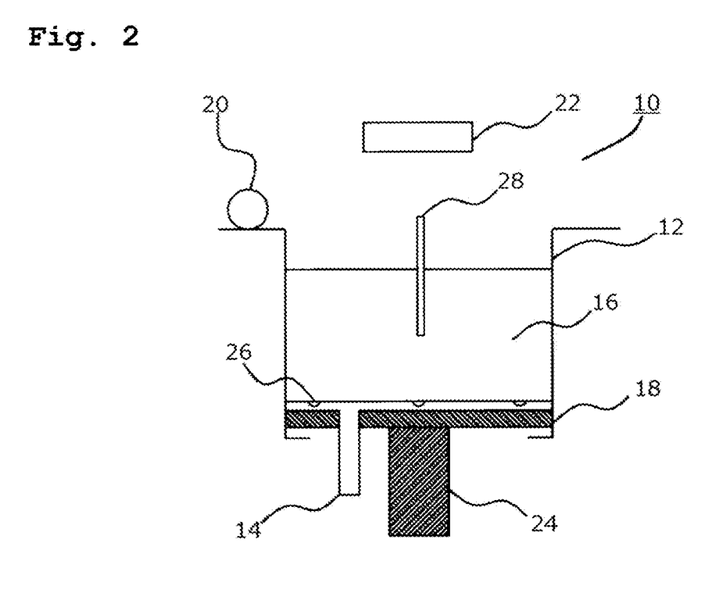
FIG. 2 is a schematic diagram illustrating a configuration of an additive manufacturing apparatus according to a second embodiment of the present invention.

FIG. 2 is a schematic diagram illustrating a configuration of the additive manufacturing apparatus according to the second embodiment of the present invention. The reference numerals are similar to those in FIG. 1, except that the temperature measurement unit is denoted by numeral 28.

First, as illustrated in FIG. 2, the additive manufacturing apparatus 10 according to the present embodiment builds a manufacturing object by building of repeating a procedure of forming a sintered portion or a fused portion by selectively heating a thinly developed powder material in the working region 12 on the basis of drawing data derived from three-dimensional data of the manufacturing object and a procedure of further forming a new thin layer on the sintered portion or the fused portion.

Furthermore, the present invention is characterized by including one or more channels 14 connecting the inside and outside of the working region 12, and introducing a fluid to a crack progressing to an un-fused power material (cake 16 containing a manufacturing object) through the channel 14 after the building is finished, so as to forcibly cool the sintered portion or the fused portion and the un-fused powder material, and by including a temperature measurement unit 28 to measure the internal temperature of the un-fused power material after building, and the fluid is introduced through the channel 14 in a case where the temperature measurement unit 28 measured the internal temperature below a prescribed temperature.

Subsequently, the additive manufacturing apparatus 10 in the present embodiment will be described in detail. As illustrated in FIG. 2, the additive manufacturing apparatus 10 includes the temperature measurement unit 28 to measure the internal temperature of the cake 16 containing a manufacturing object, in addition to the configuration of the first embodiment. Note that the crack does not occur at all at the time of lamination, and occurs when cooling advances after completion of building. In consideration of introducing the fluid into the crack, there is a need to detect or estimate a significant progress of the crack. Conversely, a great cooling effect cannot be expected by introducing the fluid from the hole 26 in the state where there are no progress of the crack.

As described above, the crack is highly relevant to the recrystallization temperature. Accordingly, the crack can be estimated to have a progress in a case where the cooling has advanced to the degree that the internal temperature reaches the recrystallization temperature. Therefore, it would be the most efficient cooling to start introduction of the fluid into the crack of the cake 16 containing a manufacturing object through the channel 14 and the hole 26 after the internal temperature falls below the prescribed temperature, specifically the recrystallization temperature of the resin.

Another possible method of estimating the progress of the crack would be to estimate the internal temperature from the elapsed time after the completion of building. When the cake 16 containing a manufacturing object is cooled by natural cooling, the time needed for the cooling can be prescribed by a lamination height. Since the time needed for cooling can be prescribed, it is also possible to estimate the time for the internal temperature to reach the recrystallization temperature, that is, the time at which the crack progresses greatly.

Cooling can be performed by starting to introduce the fluid from the hole 26 at this time. While this method does not directly measure the internal temperature and thus lowers the accuracy of estimation, there is an advantage that there is no need to use the temperature measurement unit 28. In that case, it is better to use a database describing the relationship between lamination height and internal temperature from empirical rules or theoretical inference. Moreover, it would be preferable to use a database describing a relationship between the lamination height and the passage of time of the crack progress to estimate the elapsed time after the building during which the crack progresses, from the lamination height by the building, and to introduce the fluid when the elapsed time arrives. Alternatively, it is also allowable to employ a method of deriving an approximate expression from the database and determining the introduction time of the fluid.

In addition, while the internal temperature condition changes depending on the estimated volume and position of the manufacturing object, the volume ratio of the manufacturing object in the cake 16 containing the manufacturing object stays about several %, and the volume change due to the lamination height is dominant with respect to the time needed to cool the internal temperature. In the case of performing estimation with higher accuracy, it is also allowable to estimate the internal temperature by heat conduction simulation using the volume ratio of the manufacturing object in the cake 16 containing the manufacturing object or the position information as a parameter.

Subsequently, an additive manufacturing apparatus according to a third embodiment the present invention will be described with reference to the drawings.

Figure 3:
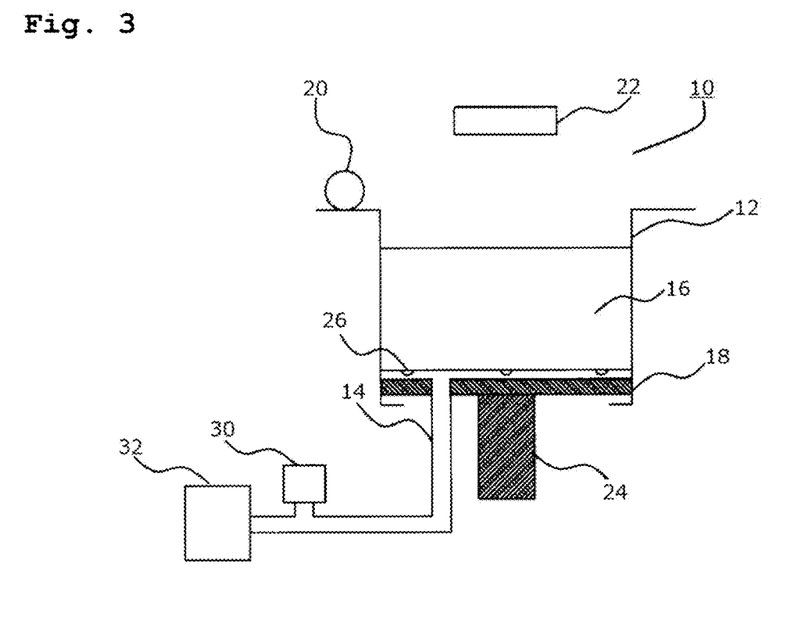
FIG. 3 is a schematic diagram illustrating a configuration of an additive manufacturing apparatus according to a third embodiment of the present invention.

FIG. 3 is a schematic diagram illustrating a configuration of the additive manufacturing apparatus according to the third embodiment of the present invention. The reference numerals are similar to those in FIG. 1, except that the pressure measurement unit is denoted by numeral 30 and the flow rate controller is denoted by 32.

First, as illustrated in FIG. 3, the additive manufacturing apparatus 10 according to the present embodiment builds a manufacturing object by building of repeating a procedure of forming a sintered portion or a fused portion by selectively heating a thinly developed powder material in the working region 12 on the basis of drawing data derived from three-dimensional data of the manufacturing object and a procedure of further forming a new thin layer on the sintered portion or the fused portion.

Furthermore, the present invention is characterized by including one or more channels 14 connecting the inside and outside of the working region 12, and introducing a fluid to a crack progressing to an un-fused power material (cake 16 containing a manufacturing object) through the channel 14 after the building is finished, so as to forcibly cool the sintered portion or the fused portion and the un-fused powder material, and characterized in that the channel 14 includes one or more pressure measurement units 30 to measure the pressure of the fluid and one or more flow rate controllers 32 to control the flow rate of the fluid, and that the pressure measurement unit 30 and the flow rate controller 32 control to suppress introduction of the fluid having a prescribed pressure or more into the crack progressing in the power material (cake 16 containing manufacturing object) through the channel 14.

Subsequently, the additive manufacturing apparatus 10 according to the present embodiment will be described in detail. As illustrated in FIG. 3, in addition to the configuration of the first embodiment, the additive manufacturing apparatus 10 includes the pressure measurement unit 30 and the flow rate controller 32 in order to perform cooling more safely and stably. More specifically, the additive manufacturing apparatus 10 causes the pressure measurement unit 30 to measure the pressure in the channel 14 and causes the flow rate controller 32 to control the flow rate so as to suppress introduction of the fluid having a predetermined pressure or more from the channel 14, in order to avoid application of overload onto the manufacturing object under cooling.

The manufacturing object during cooling is not completely solidified and thus, a pressure increase in the crack due to excessive injection of fluid from the hole 26 might possibly cause deformation of the manufacturing object in some cases. Therefore, the flow rate is controlled so as not to reach a prescribed pressure value by setting an upper limit value for the fluid pressure beforehand.

Figure 4:
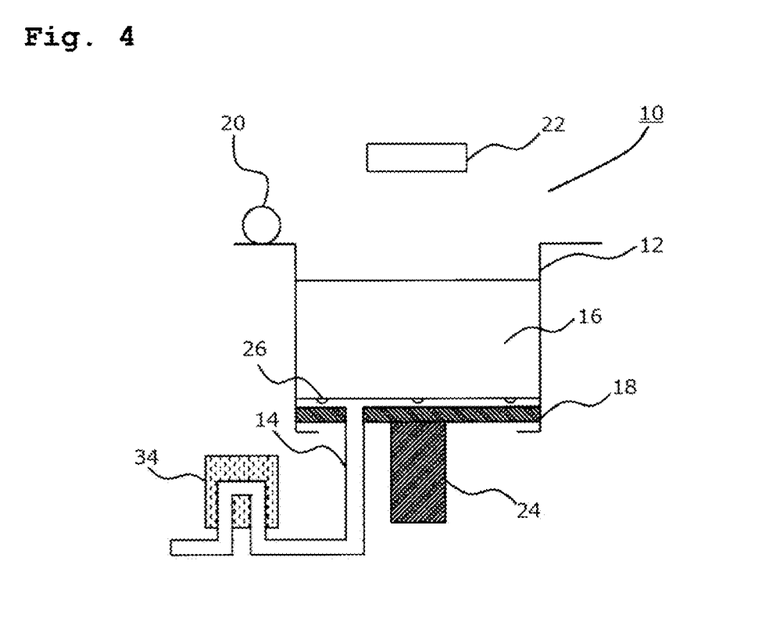
FIG. 4 is a schematic diagram illustrating a configuration of an additive manufacturing apparatus according to a fourth embodiment of the present invention.

In addition, when the solidification of the manufacturing object advances, it is allowable to increase the flow rate of the fluid under the control of the flow rate controller 32 so as to enhance the cooling efficiency. In this case, it is allowable to provide the temperature measurement unit 28 in the second embodiment together with the pressure measurement unit 30 and the flow rate controller 32, and it is allowable to change the upper limit value of the pressure after the temperature measurement unit 28 confirms a decrease in the internal temperature, and the flow rate controller 32 may increase the flow rate of the fluid until the pressure measurement unit 30 measures the upper limit value. In addition, as a fourth embodiment according to the present invention, as illustrated in FIG. 4, it is allowable to provide in the channel 14 a fluid temperature controller 34 to control the temperature of the fluid in place of the pressure measurement unit 30 and the flow rate controller 32, so as to control the temperature of the fluid to stabilize the cooling process.

Subsequently, an additive manufacturing apparatus according to a fifth embodiment the present invention will be described with reference to the drawings.

Figure 5:
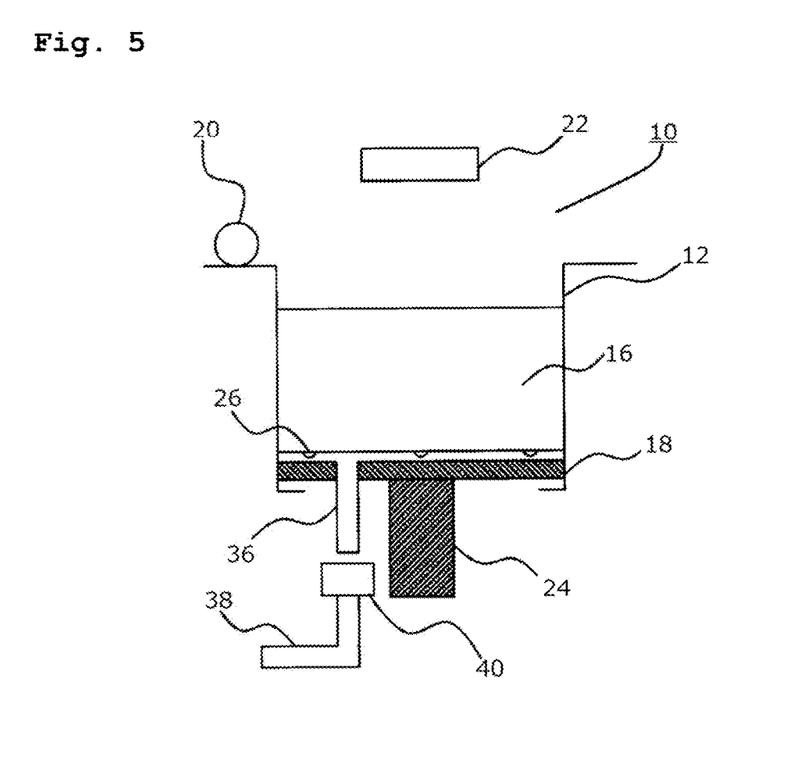
FIG. 5 is a schematic diagram illustrating a configuration of an additive manufacturing apparatus according to a fifth embodiment of the present invention.

FIG. 5 is a schematic diagram illustrating a configuration of the additive manufacturing apparatus according to the fifth embodiment of the present invention. The reference numerals are similar to those in FIG. 1 except that a channel upper end is denoted by numeral 36, a channel lower end is denoted by 38, and a connecting portion is denoted by 40.

First, as illustrated in FIG. 5, an additive manufacturing apparatus 10 according to the present embodiment builds a manufacturing object by building of repeating a procedure of forming a sintered portion or a fused portion by selectively heating a thinly developed powder material in the working region 12 on the basis of drawing data derived from three-dimensional data of the manufacturing object and a procedure of further forming a new thin layer on the sintered portion or the fused portion.

Furthermore, the present invention includes one or more channels 14 connecting the inside and outside of the working region 12, and introducing a fluid to a crack progressing to an un-fused power material (cake 16 containing a manufacturing object) through the channel 14 after the building is finished, so as to forcibly cool the sintered portion or the fused portion, and the un-fused powder material.

Furthermore, in the present embodiment, a worktable 18 capable of moving up and down is provided in the working region 12, and the manufacturing object is built on the worktable 18 by building, and the channel 14 includes the channel upper end 36 and the channel lower end 38, with the channel upper end 36 being attached to the worktable 18. One end of the channel upper end 36 is configured to be able to be connected to one end of the channel lower end 38 via the connecting portion 40 installed between the channel upper end 36 and the channel lower end 38 in accordance with an up/down position of the elevator 24 of the worktable 18.

That is, the configuration illustrated in FIG. 5 includes the connecting portion 40 between the channel upper end 36 and the channel lower end 38, and the channel upper end 36 is connected with the channel lower end 38 via the connecting portion 40 when the worktable 18 is located at a predetermined position, specifically, at a lowermost position, by the elevator 24. The worktable 18 is also heated during the building. Accordingly, it is possible to prevent the temperature of the worktable 18 from decreasing due to the thermal insulation effect by not connecting the channel upper end 36 and the channel lower end 38.

Subsequently, an additive manufacturing system according to the first embodiment the present invention will be described with reference to the drawings.

Figure 6A:
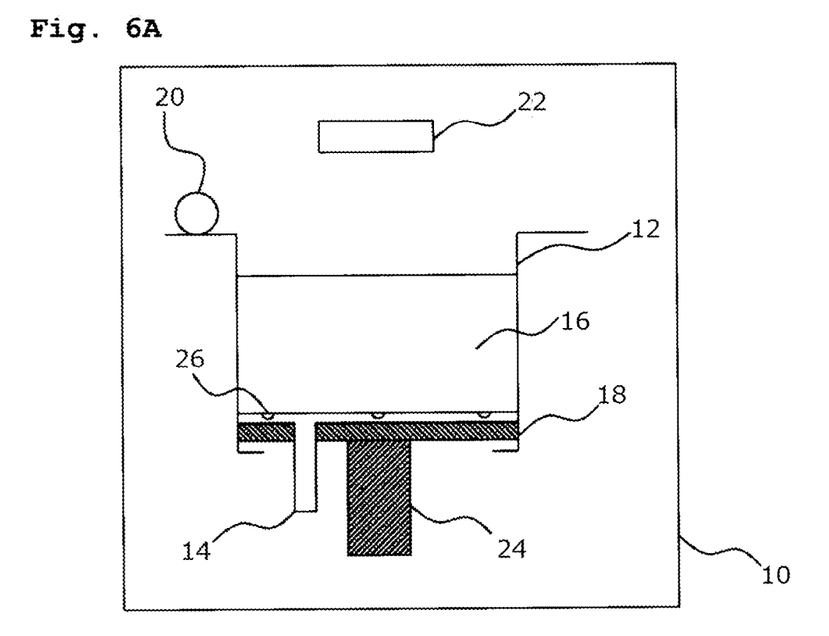
FIGS. 6A and 6B are schematic diagram illustrating the configuration of an additive manufacturing system according to the first embodiment of the present invention, (FIG. 6A illustrates an additive manufacturing apparatus, FIG. 6B illustrates a state where a portion of the additive manufacturing apparatus is stored in a storage.)
Figure 6B:
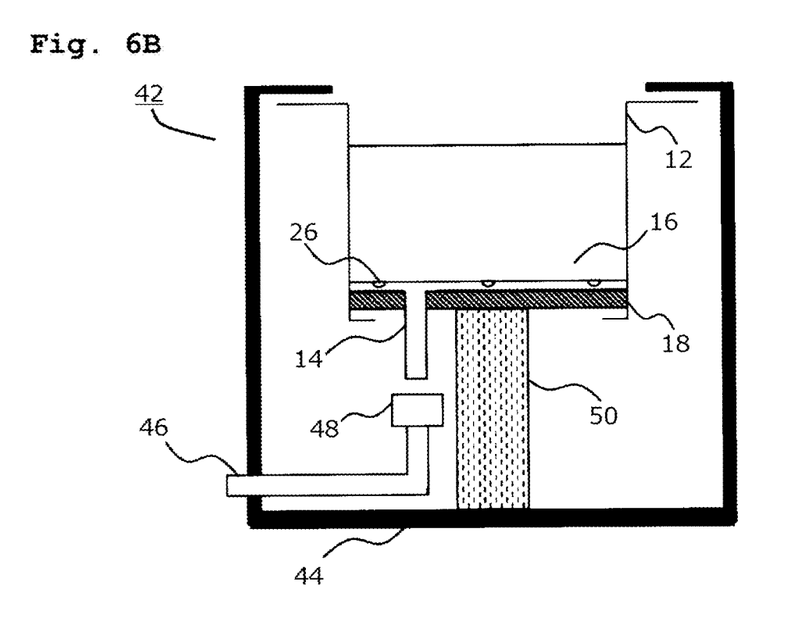

FIG. 6 is a schematic diagram illustrating a configuration of an additive manufacturing system according to the first embodiment of the present invention, in which FIG. 6A illustrates a additive manufacturing apparatus, FIG. 6B illustrates a state where a portion of the additive manufacturing apparatus is stored in a storage. The reference numerals are similar to those in FIG. 1, except that the additive manufacturing system is denoted by numeral 42, a storage is denoted by 44, an intra-storage channel is denoted by 46, an intra-storage connecting portion is denoted by 48, and an intra-storage elevator is denoted by 50.

First, as illustrated in FIG. 6, an additive manufacturing system 42 according to the present embodiment includes the additive manufacturing apparatus 10 that builds a manufacturing object by building of repeating a procedure of forming a sintered portion or a fused portion by selectively heating a thinly developed powder material in the working region 12 on the basis of drawing data derived from three-dimensional data of the manufacturing object and a procedure of further forming a new thin layer on the sintered portion or the fused portion.

Furthermore, the worktable 18 capable of moving up and down is provided within the working region 12. A manufacturing object is built by building on the worktable 18, and there are provided the storage 44 that can store the working region 12, one or more channels 14 connecting the inside and the outside of the working region 12, and one or more intra-storage channels 46 provided in the storage 44. After the building is completed, the working region 12, the channel 14, and the worktable 18 are stored in the storage 44, and the channel 14 is connected with the intra-storage channel 46 via the intra-storage connecting portion 48, and in addition, the sintered portion or the fused portion, and the un-fused powder material are forcibly cooled by introduction of a fluid from the outside of the storage 44 through the channel 14 to the crack progressing in the un-fused powder material.

As illustrated in FIGS. 6A and 6B, the additive manufacturing system 42 according to the present embodiment has a configuration in which there is no need to perform cooling in the additive manufacturing apparatus 10 and cooling is performed in the separately provided storage 44, leading to achievement of an effect that it is possible to perform next building without waiting for the completion of cooling.

Moreover, the storage 44 may also serve as a working region for extracting the manufacturing object, making it possible to immediately start working of extracting the manufacturing object immediately after the completion of cooling. At this time, the present embodiment enables movement of the worktable 18 up and down by the intra-storage elevator 50 so as to move the worktable 18 to a place suitable for operation of extracting the manufacturing object.

While the additive manufacturing apparatus 10 and the working region for extraction are often provided separately for operation in current application, the best operation method in the additive manufacturing system 42 according to the present embodiment integrates the storage 44 and the working region for extraction in order to achieve space efficiency together with cooling efficiency.

Incidentally, forming a fluid discharge path to discharge the fluid containing a powder to the outside of the working region 12 would be preferable in terms of environmental protection. Moreover, providing a filter that separates the powder from the fluid in the middle of the fluid discharge path would facilitate powder recovery.

Experiment

Figure 7:
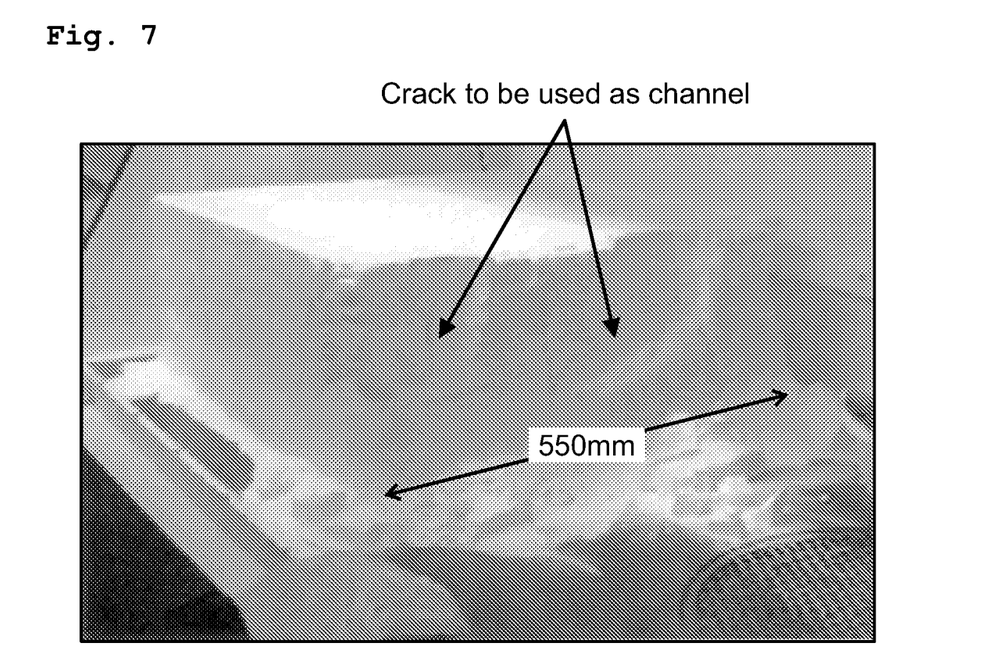
FIG. 7 is a photograph of a cake containing a manufacturing object after completion of building operation and cooling.

An experiment was performed to clarify the difference in internal temperature changes depending on the presence or absence of cooling (with or without ventilation) after building. FIG. 7 illustrates a photograph of a cake containing a manufacturing object after building and cooling. As illustrated in the figure, a crack occurred in the cake containing the manufacturing object, and this crack was used as a passage for fluid (air in this experiment).

Figure 8:
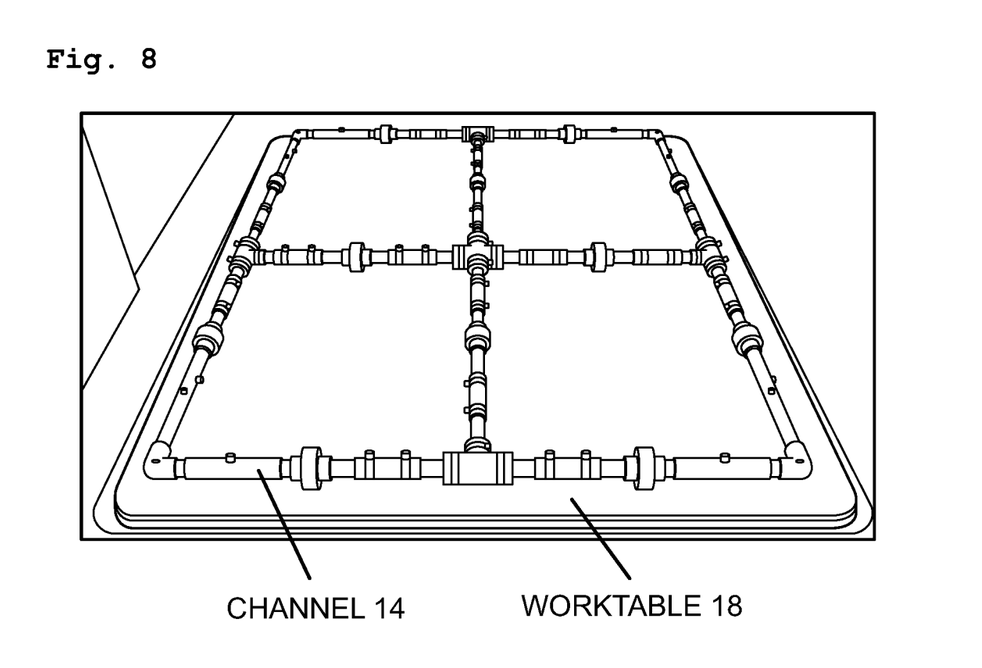
FIG. 8 is a photograph of a worktable and a channel.

A worktable and a channel illustrated in FIG. 8 are installed on the bottom surface of the cake containing the manufacturing object. This channel includes 17 holes with a diameter of about 3 mm, each being covered with a metal mesh. After completion of building, air was applied to flow through the channel to be injected from the hole to flow through the crack so as to promote cooling of the cake containing the manufacturing object. In this experiment, air was applied to flow without taking cakes containing manufacturing object out of the working region.

Figure 9:
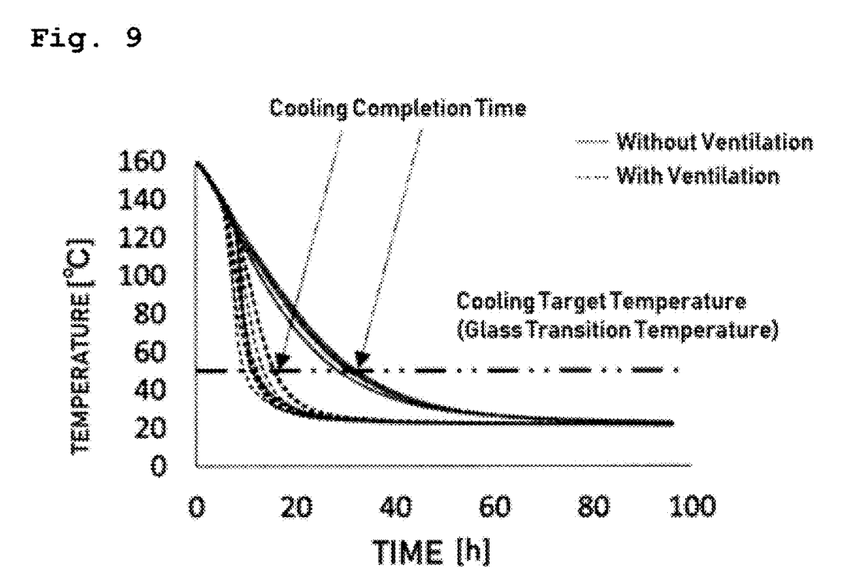
FIG. 9 is a graph illustrating experimental measurement results of changes in internal temperature in the presence or absence of cooling (by fluid introduction).

FIG. 9 illustrates a result of measuring changes in internal temperature with and without cooling (with or without ventilation). The initial temperature is about 160° C., which decreases with the passage of time. The cooling target temperature was set to 50° C. (glass transition temperature).

As illustrated in the graph of FIG. 9, while the conventional method (no cooling by fluid introduction) needed a cooling time of 16 hours, the cooling time was able to be reduced to about ½ in a case where cooling by introduction of fluid according to the present invention is performed. It was also confirmed that the size and strength of the manufactured manufacturing object were maintained to be comparable to those of the above-described conventional method.

What is claimed is:

1. An additive manufacturing method of manufacturing an object by building of repeating formation of one of a sintered portion or a fused portion, the method comprising:
    selectively heating a powder material that comprises a crystalline resin, thereby partially forming the sintered portion or the fused portion of the powder material while partially forming an un-fused solid portion of the powder material into which a crack is progressed by shrinkage of the un-fused solid portion, within a working region on the basis of drawing data derived from three-dimensional data of the object and further formation of a new layer on one of the sintered portion or the fused portion; and
    cooling the powder material down below a recrystallization temperature of the crystalline resin,
    wherein the selectively heating is repeated thereby building up layers of one of the sintered portion or the fused portion to manufacture the object, and
    the cooling includes:
    providing one or more channels connecting the inside and the outside of the working region;
        introducing a fluid into the crack progressed into the un-fused solid portion of the powder material through the one or more channels after completion of building to forcibly cool one of the sintered portion or the fused portion, and the un-fused solid portion of the powder material;
        providing a temperature measurement unit to measure an internal temperature of the un-fused solid portion of the powder material; and
        providing a flow rate controller in the one or more channels to control a flow rate of the fluid, and
    wherein:
        the fluid is introduced through the one or more channels in a case where an internal temperature of the un-fused solid portion of the powder material after completion of building falls down below the recrystallization temperature of the crystalline resin; and
        the flow rate controller increases the flow rate of the fluid to be introduced through the one or more channels in accordance with a decrease in the internal temperature in a case where the temperature measurement unit measured the decrease in the internal temperature.

2. The additive manufacturing method according to claim 1, further comprising providing a database having recorded a lamination height and an elapsed time from the completion of building during which the crack of the powder material progresses at the lamination height,
    wherein the elapsed time from the completion of building during which the crack of the powder material progresses is estimated on the basis of the database from the lamination height, and the fluid is introduced through the one or more channels when the elapsed time arrives.

3. The additive manufacturing method according to claim 1,
    wherein the one or more channels includes one or more pressure measurement units to measure a pressure of the fluid, and
    the pressure measurement unit and the flow rate controller control the fluid flow rate to suppress introduction of the fluid having a prescribed pressure or a pressure higher than the prescribed pressure into the crack progressing in the powder material through the one or more channels.

4. The additive manufacturing method according to claim 1,
    wherein a temperature controller for controlling the temperature of the fluid introduced through the one or more channels to a crack progressing in the powder material is provided in the one or more channels.

5. The additive manufacturing method according to claim 1,
    wherein a worktable capable of moving up and down is provided in the working region,
    the object is built on the worktable by the building and the one or more channels includes a channel upper end and a channel lower end with the channel upper end being attached to the worktable, and
    one end of the channel upper end is configured to be able to be connected to one end of the channel lower end via a connecting portion installed between the channel upper end and the channel lower end in accordance with an up/down position of the worktable.

6. The additive manufacturing method according to claim 1,
    wherein a fluid discharge path through which the fluid introduced from the one or more channels into the working region can be discharged to the outside of the working region is formed.

7. The additive manufacturing method according to claim 6,
wherein a filter to separate the powder material from the fluid is provided in the middle of the fluid discharge path.

8. An additive manufacturing method of manufacturing an object by building of repeating formation of one of a sintered portion or a fused portion, the method comprising:
selectively heating a powder material that comprises a crystalline resin, thereby partially forming the sintered portion or the fused portion of the powder material while partially forming an un-fused solid portion of the powder material into which a crack is progressed by shrinkage of the un-fused solid portion, within a working region on the basis of drawing data derived from three-dimensional data of the object and further formation of a new layer on one of the sintered portion or the fused portion; and
cooling the powder material down below a recrystallization temperature of the crystalline resin,
wherein the selectively heating is repeated thereby building up layers of the one of the sintered portion or the fused portion to manufacture the object, and
the cooling includes:
providing one or more channels connecting the inside and the outside of the working region;
introducing a fluid into the crack progressed into the un-fused solid portion of the powder material through the one or more channels after completion of building to forcibly cool one of the sintered portion or the fused portion, and the un-fused solid portion of the powder material;
providing a temperature measurement unit to measure an internal temperature of the un-fused solid portion of the powder material; and
providing a flow rate controller in the one or more channels to control a flow rate of the fluid,
wherein the working region includes a worktable capable of moving up and down, the object being built on the worktable; and
wherein the flow rate controller increases the flow rate of the fluid to be introduced through the one or more channels in accordance with a decrease in the internal temperature in a case where the temperature measurement unit measured the decrease in the internal temperature,
the method further comprises:
providing a storage capable of storing the working region and includes one or more intra-storage channels connecting the inside and outside of the storage,
storing the working region, the worktable, and the one or more channels in the storage after completion of building, and
connecting the one or more channels with the one or more intra-storage channels via an intra-storage connecting portion,
wherein the fluid is introduced through the one or more channels in a case where an internal temperature of the un-fused solid portion of the powder material after completion of building falls down below the recrystallization temperature of the crystalline resin.

9. The additive manufacturing method according to claim 8,
wherein the storage is available as a working region for extracting the object.

10. The additive manufacturing method according to claim 9,
wherein a fluid discharge path through which the fluid introduced through the one or more channels into the working region can be discharged to the outside of the working region is formed.

11. The additive manufacturing method according to claim 10,
wherein a filter to separate the powder from the fluid is provided in the middle of the fluid discharge path.

12. The additive manufacturing method according to claim 8,
wherein a fluid discharge path through which the fluid introduced through the one or more channels into the working region can be discharged to the outside of the working region is formed.

13. The additive manufacturing method according to claim 12,
wherein a filter to separate the powder from the fluid is provided in the middle of the fluid discharge path.

* * * * *